R. T. HUGHES.
CUTTING MACHINE.
APPLICATION FILED SEPT. 26, 1917.
1,281,012.
Patented Oct. 8, 1918.
2 SHEETS—SHEET 1.
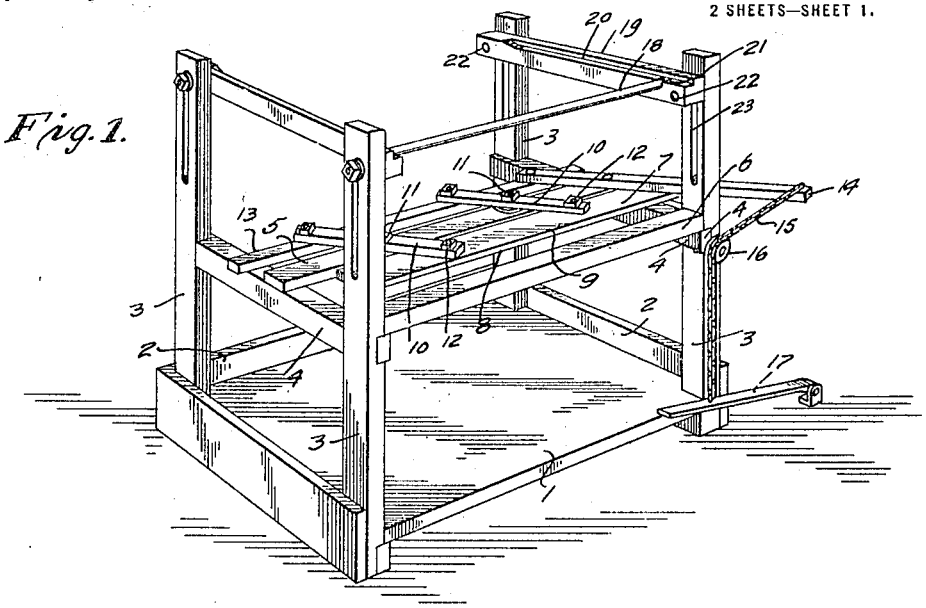
Fig. 1.
Fig. 5.
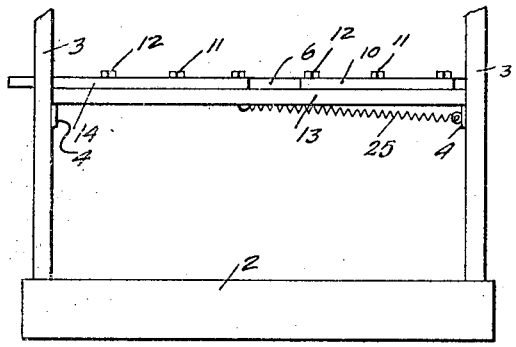
Fig. 4.
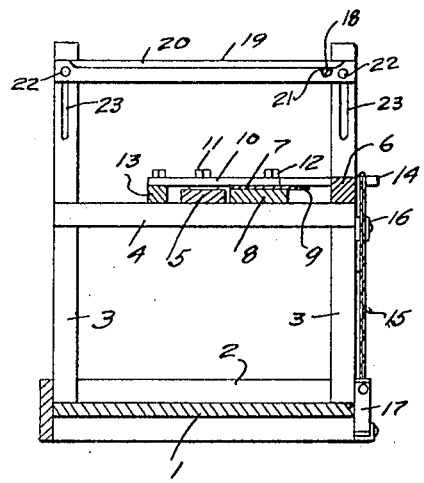
Witnesses:—
Inventor
R. T. Hughes
By
Attorneys.

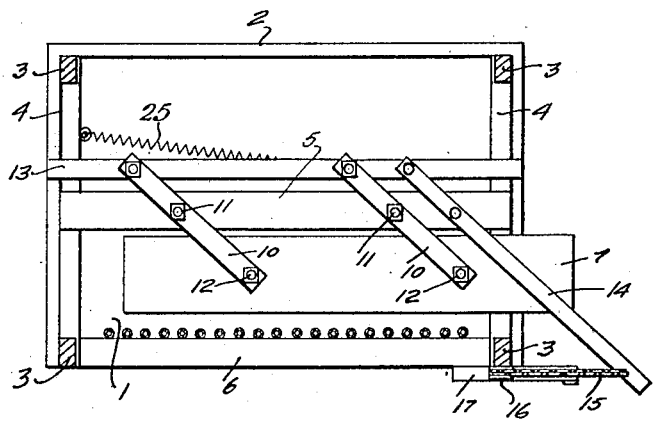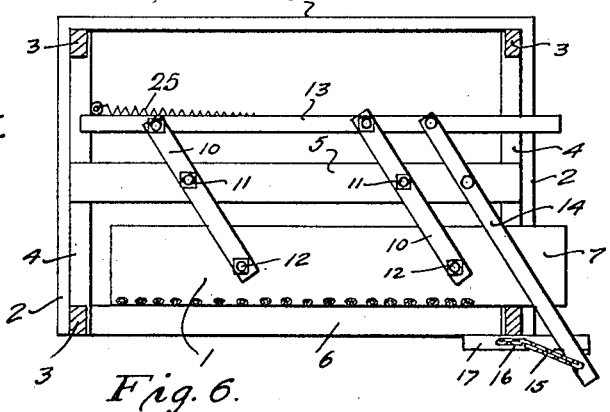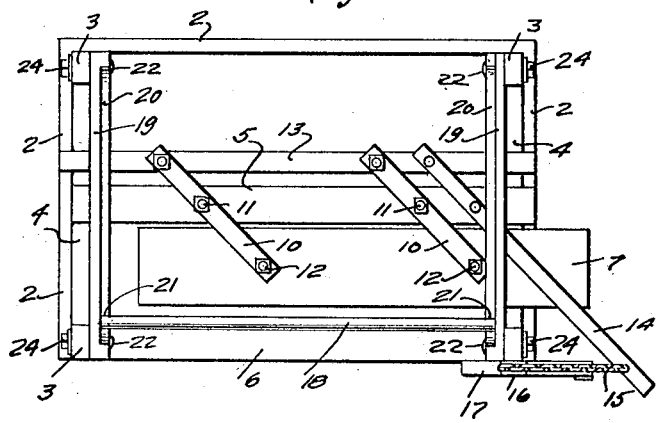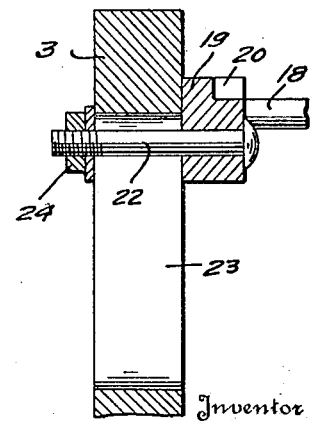

UNITED STATES PATENT OFFICE.

ROBERT T. HUGHES, OF CHICAGO, ILLINOIS.

CUTTING-MACHINE.

1,281,012.   Specification of Letters Patent.   Patented Oct. 8, 1918.

Application filed September 26, 1917. Serial No. 193,231.

*To all whom it may concern:*

Be it known that I, ROBERT T. HUGHES, a citizen of the United States, residing at Chicago, in the county of Cook, State of Illinois, have invented certain new and useful Improvements in Cutting-Machines; and I do hereby declare the following to be a full, clear, and exact description of the invention, such as will enable others skilled in the art to which it appertains to make and use the same.

This invention relates to machinery for the manufacture of macaroni.

The object of the invention is to provide a machine for properly cutting the strips or sticks of macaroni after they come from the forming machine and it is necessary to cut them into the proper length for drying.

In the manufacture of macaroni, as it has been heretofore known to me, lengths of the formed strands are taken from the forming machine and strung upon sticks to be suspended in a cutting machine or frame. In this frame the strands rest vertically against a cutting bar, so that a knife in the hands of an operator may be carried across the strands to sever them into boxing lengths before drying. In carrying out the cutting operation, it is necessary for the proper drying of the macaroni, that the ends of the cut lengths be kept open. Furthermore, it is necessary that the strands be cut before they become too dry and are therefore in danger of breaking instead of cutting when the attempt is made to sever them.

In making the cuts in either of two possible ways with a knife, certain disadvantages arise. Thus, if the knife is drawn across the top of the cutting bar, so as to sever the material with a shearing cut, the ends of the sticks or strands will be closed by reason of the combined compression of the tubes and the tendency of the knife to draw one side of the tubular formation of dough below the other side. On the other hand, if the knife is drawn along the face of the cutting bar, the tendency then is to cause the strands to follow the knife and distort and tangle them. And when either of these methods is followed it is necessary that the strands shall have been dried to such an extent that they have begun to possess a certain degree of stiffness, such that the dough would not mix with the mass from which the strands were formed.

The particular object of this invention, therefore, is to provide a cutting machine which will obviate the above enumerated disadvantages. Thus, I have mounted opposite the cutting bar a cutter blade which works against the face of the bar with a quick stroke having in its action the motion of a draw cut, the action, which parallels the direction of the cutting bar being of such short duration that there is no tendency of the strips or strands of macaroni to follow the blade, and the motion toward the cutting bar, in combination with the draw of the cut being such that it takes advantage of the resilience inherent in the dough of the freshly formed strands to spring back into their round open conformation as the cut is made. Therefore, by this method, the lengths are not only cut so as to leave the ends thereof open, but the wastage of partially dried ends is avoided, since the odd lengths which remain after the lengths are cut can be returned to the dough mass to be again expressed in further strands.

With the above objects in view, and such others relating to the details of construction, as may hereinafter appear, my invention will now be fully set forth and described, reference being had to the accompanying drawings.

In the drawings:—

Figure 1 is a perspective view of the machine,

Fig. 2 is a horizontal section showing the cutting blade inoperative,

Fig. 3 is another horizontal section showing the blade in the action of cutting, Fig. 4 is a transverse section, Fig. 5 is a rear view partly broken away, Fig. 6 is a plan view, and Fig. 7 is a detail of an adjusting feature.

Referring more particularly to the drawings, 1 represents a base or table which is inclosed upon three sides by means of the side boards 2, and which has rising from its corners the standards 3. At a suitable height above the table 1 there are extended from front to rear across the standards 3 the cross bars 4 upon which is supported a fixed carrier bar 5 and which also assists in supporting a cutting bar 6, the latter extending across the machine between the forward standards 3 so that its rear face coincides with or extends beyond the rear sides of said forward standards.

The cutting bar 6 is preferably formed of maple wood, because of the hard, non-porous character, which properly resists the action of the cutting blade or knife 7 thereagainst.

The knife or blade 7 operates against the rear face of the cutting bar 6, and is formed of a flat metal plate mounted upon the upper side of a bar 8, so that its cutting edge 9 overhangs the forward side of said bar 8. The bar 8 lies in front of the supporting beam or bar 5, and substantially parallels the latter, so that a pair of link bars 10 which are pivoted at their middle points upon spindles 11 rising from the beam 5 and extend diagonally in the same direction across the beam 8, may support the beam 8 upon the vertical spindles 12. Thereby, when the link bars 10 are swung upon their spindles 11, they will carry the bar 8 and the knife 7 forwardly toward the cutting bar 6 in continuous parallelism to the latter, and the edge of the knife 7 will pass through the strands of macaroni with a short quick draw stroke which does not close the ends of the strands as does a shear cut, and the inherent resilience of the dough will cause the openings to spring back to their round contour. The rear ends of the link bars 10 overhang the back of the beam 5, and are connected by means of a connecting rod 13 which insures the unitary action of the links.

Also pivotally mounted upon the upper face of the beam 5 is an operating lever 14 whose rear end is pivotally connected to the connecting rod 13, so that operation of the lever 14 will swing the knife 7 toward and away from the cutting bar 6. The outer end of the operating lever 14 extends beyond the side of the frame structure and also forwardly beyond the adjacent front standard 3. A flexible connection, such as a chain 15 has one end connected to the free end of the lever 14 and passes thence over a pulley 16 mounted adjacent the corner of the frame, and finally has its lower end connected to a foot pedal 17 suitably pivoted to the lower end of the frame structure, so that the knife 7 may be operated by foot power.

The macaroni is carried from the expressing or forming machine upon mandrels 18, the latter being of such length that they will be received between the standards 3 upon adjustable cross bars 19, the latter having the recessed track-ways 20 formed therein to carry the ends of the bars. Notches 21 are formed in the track-ways 20 so as to accurately position the mandrels over the cutting position. In order to permit the cutting of the strands at different lengths, the cross bars 19 are supported upon bolts 22 which pass through slots 23 in the standards 2, and may be tightened therein by means of the adjusting heads 24 which are threaded upon the bolts 22.

In the use of the device which has been above described, macaroni is received from the expressing machine, and laid in convenient lengths upon the mandrels 18 in slightly spaced relation. The mandrels are then placed in the recesses 20, the mandrel to be operated upon being dropped into the notches 21, so that the ends of the macaroni will project between the edge 9 and the cutting bar 6. Then, after the proper length has been set, the knife 7 is swung forwardly by pressure upon the pedal 17, so that the ends of the macaroni are cut off. When the pressure is released from the pedal 17, the knife is returned to its normal position by any suitable instrumentality, such as a spring 25 interposed between the connecting rod 13 and a stationary part of the frame.

The action of the short and abruptly angled draw cut has been hereinbefore defined, but it should be particularly noted that the simultaneous action of this cut upon all of the strands prevents one from being dragged against another, and also severs the strands so sharply that the edges of the cut have no opportunity to adhere one to another as is the case with a shear cut, and therefore the material, through the inherent resilience of the dough springs back into its original shape for drying. Also, there is no wastage of the ends of the dough, since my improved machine permits the cutting of the dough before the material has dried to such an extent that it may not be returned to the batch.

What I claim as my invention is:—

1. A macaroni cutting machine comprising a frame, a cutting bar carried thereby, a supporting bar carried by the frame at one side of the cutting bar, links pivoted to the supporting bar, a knife blade pivoted to said links and movable obliquely toward the cutting bar for engagement therewith, and means for suspending strands of macaroni between the knife blade and cutting bar.

2. A macaroni cutting machine comprising a frame, a cutting bar carried thereby, a supporting bar carried by the frame at one side of the cutting bar, link bars having intermediate portions pivoted to the supporting bar, a knife blade pivoted to the ends of the link bars adjacent the cutting bar and movable obliquely toward the cutting bar for engagement therewith, a bar connecting the other ends of the link bars, a spring secured to said connecting bar and to the frame to normally retract the knife, means for moving the connecting bar in opposition to the spring and means for suspending strands of macaroni between the knife and cutting bar.

3. A macaroni cutting machine comprising a frame, a cutting bar carried thereby, a knife carried by the frame at one side of the cutting bar and movable theretoward, a member carried by the frame for suspending strands of macaroni between the knife and cutter bar and means for adjusting said member vertically to vary the lengths of strands cut by said knife.

In testimony whereof, I affix my signature in the presence of two witnesses.

ROBERT T. HUGHES.

Witnesses:
  SETH HARRY,
  WILLIAM HOSKINS.

Copies of this patent may be obtained for five cents each, by addressing the "Commissioner of Patents, Washington, D. C."